(12) United States Patent
Ko et al.

(10) Patent No.: US 12,066,596 B2
(45) Date of Patent: Aug. 20, 2024

(54) COVER WINDOW, METHOD OF MANUFACTURING COVER WINDOW, AND DISPLAY DEVICE

(71) Applicant: Samsung Display Co., LTD., Yongin-si (KR)

(72) Inventors: Ji Hyun Ko, Suwon-si (KR); Hyun Seung Seo, Suwon-si (KR); Dong Sung Lee, Suwon-si (KR); Yong Kyu Kang, Hwaseong-si (KR); Hui Yeon Shon, Seongnam-si (KR); Hyun Kyung Yun, Namyangju-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 392 days.

(21) Appl. No.: 17/359,979

(22) Filed: Jun. 28, 2021

(65) Prior Publication Data
US 2022/0082732 A1 Mar. 17, 2022

(30) Foreign Application Priority Data
Sep. 16, 2020 (KR) .......................... 10-2020-0118774

(51) Int. Cl.
*G02B 1/14* (2015.01)
*H04M 1/02* (2006.01)

(52) U.S. Cl.
CPC ............ *G02B 1/14* (2015.01); *H04M 1/0266* (2013.01)

(58) Field of Classification Search
CPC ........ G02B 1/14; G02F 1/133331; H05K 5/03
See application file for complete search history.

(56) References Cited

U.S. PATENT DOCUMENTS

| 2014/0353874 | A1* | 12/2014 | Han | ................. B29C 45/14811 |
| | | | | 428/68 |
| 2017/0156227 | A1* | 6/2017 | Heo | ..................... H05K 5/0017 |
| 2018/0001347 | A1* | 1/2018 | Cho | ....................... G06F 1/1637 |
| 2019/0194066 | A1* | 6/2019 | Omote | ...................... H05K 5/03 |
| 2019/0377386 | A1* | 12/2019 | Heo | ................... B32B 17/10155 |
| 2021/0289648 | A1* | 9/2021 | Lee | ............................ H05K 5/03 |

FOREIGN PATENT DOCUMENTS

| KR | 1020150000361 A | 1/2015 |
| KR | 1020180002932 A | 1/2018 |
| KR | 1020190052730 A | 5/2019 |
| KR | 1020190141069 A | 12/2019 |
| KR | 1020200123885 A | 11/2020 |

* cited by examiner

*Primary Examiner* — Jia X Pan
(74) *Attorney, Agent, or Firm* — CANTOR COLBURN LLP

(57) ABSTRACT

A cover window includes a base layer; a first coating layer on the base layer; and a second coating layer on the first coating layer. The first coating layer directly contacts a first part of an upper surface of the base layer and exposes a second part of the upper surface of the base layer, the upper surface of the base layer consists of the first part and the second part, and the second coating layer directly contacts the second part of the upper surface of the base layer exposed by the first coating layer, and an upper surface of the first coating layer.

10 Claims, 12 Drawing Sheets

COVER WINDOW, METHOD OF MANUFACTURING COVER WINDOW, AND DISPLAY DEVICE

This application claims priority to Korean Patent Application No. 10-2020-0118774 filed on Sep. 16, 2020, and all the benefits accruing therefrom under 35 U.S.C. § 119, the content of which in its entirety is herein incorporated by reference.

BACKGROUND

1. Field of the Invention

The present invention relates to a cover window, a method of manufacturing a cover window, and a display device.

2. Description of the Related Art

A display device for displaying an image is used for various electronic appliances for providing an image to a user, such as smart phones, tablet PCs, digital cameras, notebook computers, navigators, and televisions. The display device includes a display panel for generating and displaying an image and a transparent cover window for covering the display surface of the display panel.

The cover window functions to protect the display panel from external impacts and scratches applied during use. Typical materials of the cover window are glass and plastic. In particular, when the cover window is made of plastic, in order to appropriately perform the protection function of the display panel, the strength of the cover window may be increased by forming a hard coating layer on the surface of the plastic.

SUMMARY

An aspect of the present invention is to provide a cover window having improved reliability.

Another aspect of the present invention is to provide a display device including the cover window having improved reliability.

Still another aspect of the present invention is to provide a method of manufacturing the cover window having improved reliability.

According to an embodiment, a cover window includes a base layer; a first coating layer on the base layer; and a second coating layer on the first coating layer. The first coating layer directly contacts a first part of an upper surface of the base layer and exposes a second part of the upper surface of the base layer, the upper surface of the base layer consists of the first part and the second part, and the second coating layer directly contacts the second part of the upper surface of the base layer exposed by the first coating layer, and an upper surface of the first coating layer.

According to another embodiment, a display device includes a display panel; and a cover window on the display panel, wherein the cover window includes: a base layer disposed on the display panel; a first coating layer on the base layer; and a second coating layer on the first coating layer. The first coating layer directly contacts a first part of the base layer and exposes a second part of the base layer, the upper surface of the base layer consists of the first part and the second part, and the second coating layer directly contacts the second part of the base layer exposed by the first coating layer, and the first coating layer.

According to still another embodiment, a method of manufacturing a cover window comprises forming an original first coating layer on an original sheet by primary coating; dividing both the original sheet and the original first coating layer to form a divided sheet and a divided first coating layer, respectively; primarily processing the divided sheet and the divided first coating layer on the divided sheet; forming a second coating layer on the primarily processed divided sheet and the primarily processed first coating layer by secondary coating; and secondarily processing the secondary-coated, divided sheet.

However, aspects of the present invention are not restricted to the one set forth herein. The above and other aspects of the present invention will become more apparent to one of ordinary skill in the art to which the present invention pertains by referencing the detailed description of the present invention given below.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
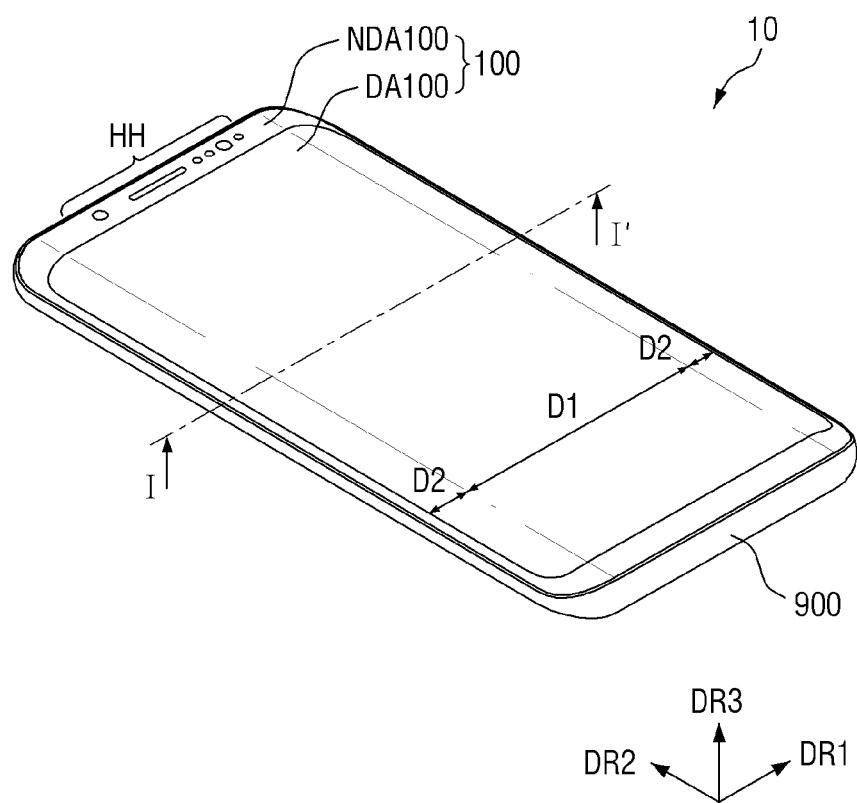
FIG. 1 is a perspective view of a display device according to an embodiment.

Specific structural and functional descriptions of embodiments of the invention disclosed herein are only for illustrative purposes of the embodiments of the invention. The invention may be embodied in many different forms without departing from the spirit and significant characteristics of the invention. Therefore, the embodiments of the invention are disclosed only for illustrative purposes and should not be construed as limiting the invention. That is, the invention is only defined by the scope of the claims.

It will be understood that when an element is referred to as being related to another element such as being "coupled" or "connected" to another element, it can be directly coupled or connected to the other element or intervening elements may be present therebetween. In contrast, it should be understood that when an element is referred to as being related to another element such as being "directly coupled" or "directly connected" to another element, there are no intervening elements present. Other expressions that explain the relationship between elements, such as "between," "directly between," "adjacent to," or "directly adjacent to," should be construed in the same way.

Throughout the specification, the same reference numerals will refer to the same or like parts.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30 percentages (%), 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the present invention will be described with reference to the attached drawings.

Figure 2:
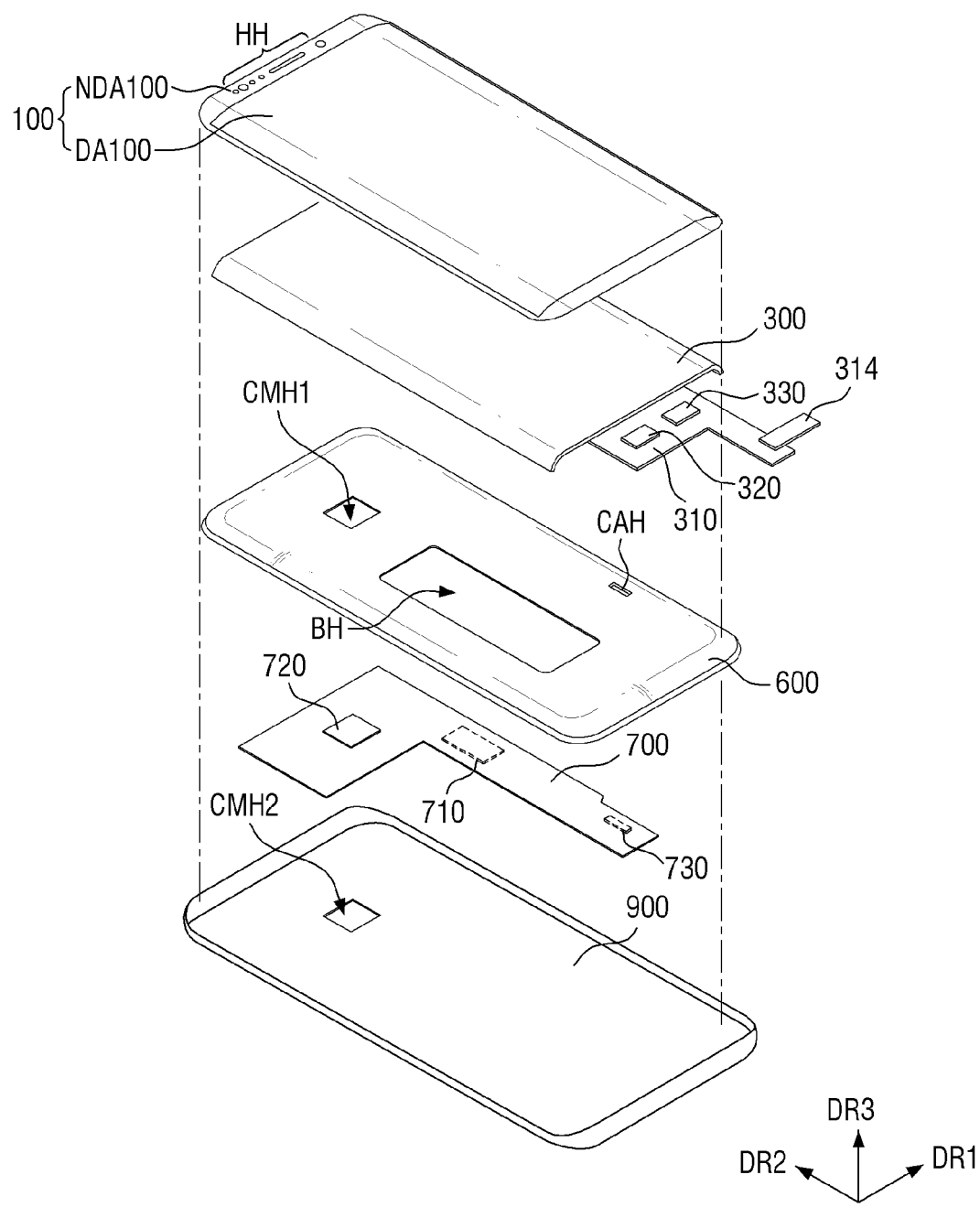
FIG. 2 is an exploded perspective view of a display device according to an embodiment.
Figure 3:
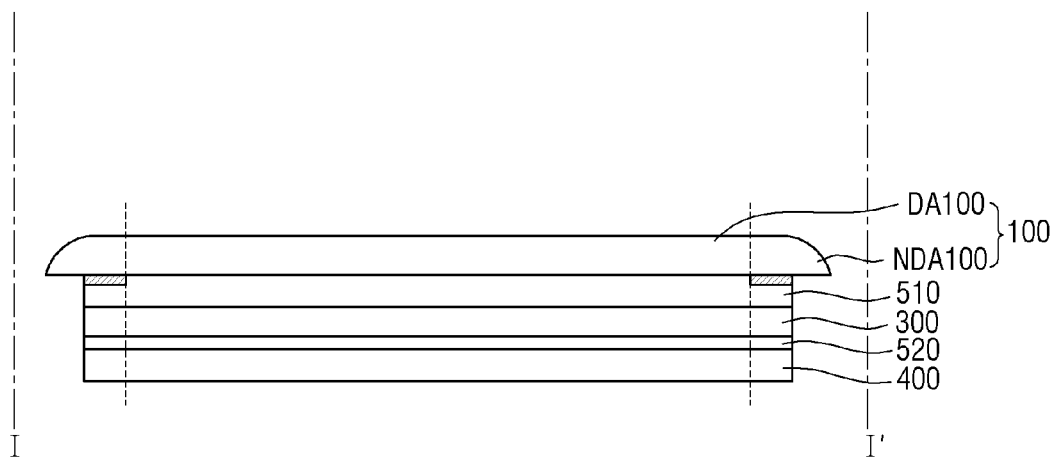
FIG. 3 is a cross-sectional view taken along the line I-I' of FIG. 1.

FIG. 1 is a perspective view of a display device according to an embodiment, FIG. 2 is an exploded perspective view of a display device according to an embodiment, and FIG. 3 is a cross-sectional view taken along the line I-I' of FIG. 1.

Referring to FIGS. 1 to 3, a display device 10 according to an embodiment includes a cover window 100, a display panel 300, a display circuit board 310, a display driver 320, a lower frame 600, a main circuit board 700, and a lower cover 900.

In this specification, the "on", "over", "top", "upper side", or "upper surface" refers to a direction in which the cover window 100 is disposed, that is, one side of the third direction DR3 with respect to the display panel 300, and the "beneath", "under", "bottom", "lower side", or "lower surface" refers to a direction in which the lower frame 600 is disposed, that is, the other side of the third direction DR3 with respect to the display panel 300. Further, the "left", "right", "upper", and "lower" refer to directions when the display panel 300 is viewed from the plane defined by a first direction DR1 and a second direction DR2 (i.e., plan view). For example, the "left" refers to the other side of the first direction DR1, the "right" refers to one side of the first direction DR1, the "upper" refers to one side of the second direction DR2, and the "lower" refers to the other side of the second direction DR2.

The display device 10 may have a rectangular shape in a plan view (i.e., view in the third direction DR3). For example, as shown in FIGS. 1 and 2, the display device 10 may have a rectangular planar shape having short sides (i.e., latitudinal sides) in the first direction DR1 (i.e., X-axis direction) and long sides (i.e., longitudinal sides) in the second direction DR2 (i.e., Y-axis direction). The edge where the short side in the first direction DR1 meets the long side in the second direction DR2 may have a round shape of a predetermined curvature or have a right-angled shape. The planar shape of the display device 10 according to the invention is not limited to a rectangular shape, and may be formed in another polygonal shape, circular shape, or elliptical shape in another embodiment.

The display device 10 may include a first area D1 formed flat and second areas D2 extending from the left and right sides of the first area D1. The second areas D2 may be flat or curved. When the second areas D2 are flat, the angle formed by the first area D1 and each of the second areas D2 may be an obtuse angle. When the second areas D2 are curved, the second areas D2 may have constant curvatures or variable curvatures.

Although it is shown in FIG. 1 that the second areas D2 extend from opposite sides of the first area D1 in the first direction DR1, respectively, the present invention is not limited thereto. That is, in another embodiment, the second areas D2 may extend from only one of the opposite sides of the first area D1 in the first direction DR1. Alternatively, the second areas D2 may extend from at least one of opposite sides in the second direction DR2 as well as opposite sides of the first area D1 in the first direction DR1. Hereinafter, a case where the second area D2 is disposed at opposite sides of the display device 10 in the first direction DR1 will be mainly described.

The cover window 100 may be disposed on the display panel 300 so as to cover the upper surface of the display panel 300. Thus, the cover window 100 may function to protect the upper surface of the display panel 300. The cover window 100 may be attached to the display panel 300 through a first adhesive member 510 as shown in FIG. 3. The first adhesive member 510 may be an optically clear adhesive ("OCA") film or an optically clear resin ("OCR") film.

The cover window 100 may include a light transmitting area DA100 corresponding to the display panel 300 and a light blocking area NDA100 corresponding to an area other than the display panel 300. The cover window 100 may be disposed in the first area D1 and the second areas D2. The light transmitting area DA100 may be disposed in a part of the first area D1 and parts of the second areas D2. The light blocking area NDA100 may be opaque. Alternatively, the light blocking area NDA100 may be a decorative layer having a pattern that can be seen to a user when an image is not displayed. For example, a company logo such as "SAMSUNG" or various characters may be patterned on the light blocking area NDA100. Further, the light blocking area NDA100 may be provided with a plurality of holes HH for exposing a front camera, a front speaker, an infrared sensor, an iris recognition sensor, an ultrasonic sensor, an illuminance sensor, or the like, but the present invention is not limited thereto. For example, some or all of a front camera, a front speaker, an infrared sensor, an iris recognition sensor, an ultrasonic sensor, and an illuminance sensor may be mounted in the display panel 300 in another embodiment. In this case, some or all of the plurality of holes HH may be omitted.

The cover window 100 may be made of plastic. The cover window 100 may be flexible.

Although not shown, a touch sensing unit may be further disposed between the cover window 100 and the display panel 300. The touch sensing unit may be disposed between the cover window 100 and the display panel 300. The touch sensing unit may be disposed in the first area D1 and the second areas D2. Thus, the touch sensing unit may sense a user's touch in the second areas D2 as well as the first area D1.

When the touch sensing unit is further disposed, the touch sensing unit may be attached to the lower surface of the cover window 100 through the first adhesive member 510. The touch sensing unit may be additionally provided thereon with a polarizing film in order to prevent the deterioration of visibility due to the reflection of external light. In this case, the polarizing film may be attached to the lower surface of the cover window 100 through the first adhesive member 510.

The touch sensing unit is a unit for sensing a touch position of a user, and may be implemented as a capacitive type such as a self-capacitance type or a mutual capacitance type. When touch sensing unit is implemented as a self-capacitive type, the touch sensing unit may include only the touch driving electrodes, but when the touch sensing unit is implemented as a mutual capacitance type, the touch sensing unit may include both the touch driving electrodes and the touch sensing electrodes. Hereinafter, the touch sensing unit will be described, assuming that the touch sensing unit is implemented as a mutual capacitance type.

The touch sensing unit may be a panel type or a film type. In this case, the touch sensing unit may be attached onto a thin encapsulation film of the display panel 300 through second adhesive member. The adhesive member may be an optically clear adhesive (OCA) film or an optically clear resin (OCR) film.

Alternatively, the touch sensing unit may be formed integrally with the display panel 300. In this case, the touch driving electrodes and touch sensing electrodes of the touch sensing unit may be disposed on the thin encapsulation film of the display panel 300.

The display panel 300 may be disposed under the touch sensing unit. The display panel 300 may be disposed to overlap the light transmitting area 100DA of the touch sensing unit. The display panel 300 may be disposed in the first area D1 and the second areas D2. Thus, the image of the display panel 300 may be seen not only in the first area D1 but also in the second areas D2.

The display panel 300 may be a light emitting display panel including a light emitting element. Examples of the display panel 300 may include an organic light emitting display panel using an organic light emitting diode, an ultra-small light emitting diode display panel using a micro LED, or a quantum dot light emitting diode display panel using a quantum dot light emitting diode.

A display circuit board 310 may be attached to one side of the display panel 300. Specifically, one side of the display circuit board 310 may be attached onto pads provided on the one side of the display panel 300 using an anisotropic conductive film. The display circuit board 310 may be bent toward the lower surface of the display panel 300.

The display driver 320 outputs signals and voltages for driving the display panel 300 through the display circuit board 310. The display driver 320 may be formed as an integrated circuit and mounted on the display circuit board 310, but the present invention is not limited thereto. For example, the display driver 320 may be attached directly to the substrate of the display panel 300 in another embodiment. In this case, the display driver 320 may be attached to the upper surface or lower surface of the display panel 300.

The panel lower member 400 may be disposed under the display panel 300. The panel lower member 400 may be attached to the lower surface of the display panel 300 through a second adhesive member 520. The second adhesive member 520 may be an optical clear adhesive (OCA) film or an optical clear resin (OCR) film.

The panel lower member 400 may include at least one of a light absorbing member for absorbing external light, a buffer member for absorbing an external impact, a heat dissipating member for efficiently emitting heat of the display panel 300, and a light blocking layer for blocking external light.

The light absorbing member may be disposed under the display panel 300. The light absorbing member inhibits the transmission of light to prevent components disposed under the light absorbing member, for example, the display circuit board 310 and the like from being viewed from above the display panel 300 (i.e., in a plan view). The light absorbing member may include a light absorbing material such as a black pigment or a dye.

The buffer member may be disposed under the light absorbing member. The buffer member absorbs an external impact to prevent the display panel 300 from being damaged. The buffer member may be a single layer or a plurality of layers. For example, the buffer member may include or be formed of a polymer resin such as polyurethane, polycarbonate, polypropylene, or polyethylene, or may include or be formed of an elastic material such as a rubber, a urethane material, or a sponge formed by foaming an acrylic material. The buffer member may be a cushion layer.

The heat dissipating member may be disposed under the buffer member. The heat dissipating member may include a first heat dissipating layer including graphite or carbon nanotubes and a second heat dissipating layer capable of blocking electromagnetic waves and formed of a metal thin film of copper, nickel, ferrite or silver having excellent thermal conductivity.

The lower frame 600 may be disposed under the panel lower member 400. The lower frame 600 may include a synthetic resin, a metal, or both a synthetic resin and a metal.

The lower frame 600 may provided with a first camera hole CMH1 into which a camera device 720 is inserted, a battery hole BH through which heat is discharged from a battery, and a cable hole CAH through which a second connection cable 314 connected to the display circuit board 310 passes. Specifically, the cable hole CAH may be disposed closely at an edge (e.g., the right edge) of the frame 600. Further, the lower frame 600 is disposed under the lower panel member 400 of the display panel 300.

The main circuit board 700 may be disposed under the lower frame 600. The main circuit board 700 may be a printed circuit board or a flexible printed circuit board.

The main circuit board 700 may include a main processor 710, a camera device 720, and a main connector 730. The main processor 710 and the main connector 730 may be disposed on the lower surface of the main circuit board 700, facing the lower cover 900. The camera device 720 may be disposed on both the upper surface and lower surface of the main circuit board 700.

The main processor 710 may control all the functions of the display device 10. For example, the main processor 710 may output image data to the display driver 320 of the display circuit board 310 such that the display panel 300 displays an image. The main processor 710 may be an application processor, a central processing unit, or a system chip, which includes an integrated circuit.

The camera device 720 processes an image frame such as a still image or a moving image obtained by an image sensor in a camera mode, and outputs the processed image frame to the main processor 710.

The second connection cable 314 having passed through the connector hole CAH of the lower frame 600 may be connected to the main connector 730 disposed on the lower surface of the main circuit board 700 through the gap GAP between the frame 600 and the main circuit board 700. Thus, the main circuit board 910 can be electrically connected to the display circuit board 310.

In addition, the main circuit board 700 may be further provided with a mobile communication module capable of transmitting and receiving a radio signal to/from at least one of a base station, an external terminal, and a server. The radio signal may include various types of data depending on a voice signal, a video call signal, or a text/multimedia message transmission/reception. Further, the main circuit board 700 may be further provided with an acoustic output device capable of outputting sound and a vibration device capable of generating vibration for haptic implementation.

The lower cover 900 may be disposed under the lower frame 600 and the main circuit board 700. The lower cover 900 may be engaged and fixed to the lower frame 600. The lower cover 900 may form a lower surface appearance of the display device 10. The lower cover 900 may include plastic and/or metal.

The lower cover may be provided with a second camera hole CMH2 into which the camera device is inserted to protrude outward. The position of the camera device 720 and the positions of the first and second camera holes CMH1 and CMH2 corresponding to the camera device 720 are not limited to the embodiment shown in drawings.

The cover window 100 may extend further outward from the side surface of the display panel 300. In other words, the cover window 100 may completely cover the display panel 300 and may further extend outward from the side surface of the display panel 300.

The cover window 100 may include a curved side portion. Thus, the aesthetics of the display device 10 may be improved. The cover window 100 including a curved side portion may be vulnerable to external impact. As described above, the cover window 100 includes a flexible material, and the flexible material may easily damaged due to external impacts such as scratches. The cover window 100 according to an embodiment may further include a hard coating layer on the outer surface thereof. Details thereof will be described with reference to FIG. 4.

Figure 4:
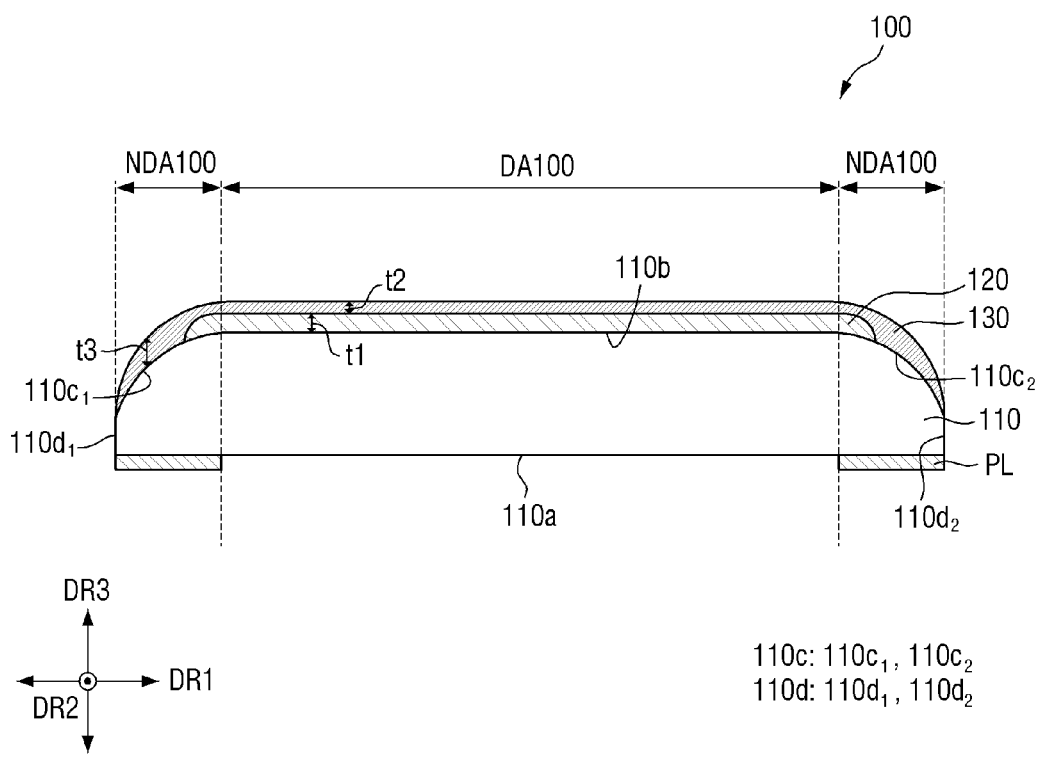
FIG. 4 is a cross-sectional view of a cover window according to an embodiment.

FIG. 4 is a cross-sectional view of a cover window according to an embodiment.

Referring to FIG. 4, the cover window 100 according to an embodiment may include a base layer 110, a first coating layer 120 on the base layer 110, and a second coating layer 130 on the first coating layer 120.

The base layer 110 may provide an area where the coating layers 120 and 130 of the cover window 100 are to be disposed. The base layer 110 may include a material of the cover window 100, for example, a flexible material.

The cover window 100 may have a curved side surface. The base layer 110 may have substantially the same cross-sectional shape as the cover window 100.

Specifically, as shown in FIGS. 3 and 4, the base layer 110 may include a first surface 110a contacting the first adhesive member 510 and facing the display panel 300, and a second surface 110b facing the first surface 110a and coated by the first coating layer 120. The first surface 110a and the second surface 110b may extend along the first direction DR1. The first surface 110a and the second surface 110b may be parallel to each other, but the present invention is not limited thereto. The length of the first surface 110a in the first direction DR1 may be longer than the length of the second surface 110b in the first direction DR1.

The base layer 110 may include a third surface between the first surface 110a and the second surface 110b. The third surface may include the other-side sub-surfaces 110c1 and 110d1 located at the other side (e.g., left side) in the first direction DR1 and connecting the first surface 110a and the second surface 110b, and one-side sub-surfaces 110c2 and 110d2 located at one side (i.e., right side) in the first direction DR1 and connecting the first surface 110a and the second surface 110b. The other-side sub-surfaces 110c1 and 110d1 and the one-side sub-surfaces 110c2 and 110d2 may divide the base layer 110 into equal segments in the first direction DR1, and may be symmetrical to each other with respect to an equal segment line extending in the third direction DR3 and crossing a center of the base layer 110. Components included in the other-side sub-surfaces 110c1 and 110d1 and components included in the one-side sub-surfaces 110c2 and 110d2 may be symmetrical to each other with respect to the equal segment line. Hereinafter, a description will be made based on the other-side sub-surfaces 110c1 and 110d1. Moreover, particularly, when there is no need to distinguish the other-side sub-surfaces 110c1 and 110d1 from the one-side sub-surfaces 110c2 and 110d2 while explaining the other-side sub-surfaces 110c1 and 110d1, the other-side sub-surfaces 110c1 and 110d1 are referred to as the third surface.

The cross-sectional shape of the third surface 110c1 and 110d1 may include at least two different shapes. For example, the cross-sectional shape of the third surface 110c1 and 110d1 may include a curved shape and a linear shape. As used herein, the curved shape may be a curved surface having a constant curvature, but is not limited thereto, and may be a curved surface having various curvatures.

The third surface 110c1 and 110d1 may include a first portion 110c1 connected to the second surface 110b and a second portion 110d1 connecting the first portion 110c1 and the first surface 110a.

The first portion 110c1 may have a curved shape, and the second portion 110d1 may have a linear shape extending along the third direction DR3. The above-described cross-sectional shape of the base layer 110 may be formed through a computer numerical control ("CNC") device, as will be described later.

In some embodiments, the above-described cross-sectional shape of the base layer 110 may be formed through a laser.

The first coating layer 120 may be disposed on the second surface 110b of the base layer 110 and a part of the first portion 110c1. The first coating layer 120 may be directly disposed on (i.e., in direct contact with) the second surface 110b of the base layer 110 and a part of the first portion 110c1.

The first coating layer 120 may expose the other part of the first portion 110c1 of the base layer 110 and the second portion 110d1 of the base layer 110.

In an embodiment, for example, the first coating layer 120 may include an organic material such as an ultraviolet-curable acrylate resin or an ultraviolet-curable epoxy resin.

In an embodiment, the first coating layer 120 may further include an inorganic material as well as the above-described organic material. An example of the inorganic material may include, but is not limited to, nano-silica sol.

In an embodiment, the first coating layer 120 may be made of a mixed organic/inorganic material including the above-described organic material and the above-described inorganic material. The first coating layer 120 may have a pencil hardness of HB or higher.

Although it is shown in FIG. 4 that the first coating layer 120 is a single layer, the present invention is not limited thereto, and the first coating layer 120 may be formed as multiple layers such as a double layer, a triple layer, and a quadruple layer.

The first coating layer 120 may serve to reinforce the strength of the cover window 100 (i.e., improve impact resistance). For example, when an impact is applied to the cover window 100, the first coating layer 120 may function to prevent damage to the base layer 110 by offsetting a stress generated in the base layer 110 by the impact. The first coating layer 120 may absorb impact energy. The thickness of the first coating layer 120 in the third direction DR3 (i.e., thickness direction) may be set in consideration of the above-described impact resistance improving function.

The first coating layer 120 may have a first thickness t1 in the third direction DR3. For example, the first thickness t1 may have a thickness of about 20 micrometers (μm) to 40 μm. When the thickness t1 of the first coating layer 120 is equal to or more than about 20 μm, the first coating layer 120 may function to properly reinforce the strength of the cover window 100. When the thickness t1 of the first coating layer 120 is less than about 40 μm, the occurrence of yellowing of the cover window 100 may be prevented in advance.

On the second surface 110b of the base layer 110, the first thickness t1 of the first coating layer 120 may have a deviation of 10% or less. As used herein, that the first thickness t1 of the first coating layer 120 has a deviation of 10% or less means that the thickness of the first coating layer 120 on the second surface 110b is substantially uniform.

A small thickness deviation for each region of the first coating layer 120 may mean that the first coating layer 120 may have a small hardness deviation for each region. In other words, as in one embodiment, the first thickness t1 of the first coating layer 120 has a deviation of 10% or less on the second surface 110b, so that the first coating layer 120 may have a small hardness variation for each region on the second surface 110b.

The first coating layer 120 may be formed through slit coating. In some embodiments, the first coating layer 120 may be formed using bar coating, spin coating, spray coating, or the like.

The second coating layer 130 may be disposed on the base layer 110. The second coating layer 130 may be disposed on the second surface 110b and the first portion 110c1 of the third surface 110c1 and 110d1. The second coating layer 130 may contact the upper and side surfaces of the first coating layer 120, respectively, and may directly contact the upper surface of the other part of the first portion 110c1 exposed by the first coating layer 120. For example, the second coating layer 130 may include an organic material such as an ultraviolet-curable acrylate resin or an ultraviolet-curable epoxy resin. In an embodiment, the second coating layer 130 may further include an inorganic material as well as the above-described organic material. An example of the inorganic material may include, but is not limited to, nano-silica sol.

In an embodiment, the second coating layer 130 may be made of a mixed organic/inorganic material including the above-described organic material and the above-described inorganic material. The second coating layer 130 may have a pencil hardness of HB or higher.

Although it is shown in FIG. 4 that the second coating layer 130 is a single layer, the present invention is not limited thereto, and the second coating layer 130 may be formed as multiple layers such as a double layer, a triple layer, and a quadruple layer.

Like the first coating layer 120, the second coating layer 130 may serve to reinforce the strength of the cover window 100 (i.e., improve impact resistance). In addition, the second coating layer 130 may serve to prevent the peeling of the first coating layer 120 from the base layer 110 by covering the first coating layer 120.

In other words, the second coating layer 130 is in direct contact with the first coating layer 120 and is in direct contact with the other part of the first portion 110c1 of the base layer 110 exposed by the first coating layer 120, thereby preventing the peeling of the first coating layer 120 from the base layer 110.

Further, the second coating layer 130 may serve to protect the cover window 100 from an external impact, for example, scratch (i.e., scratch resistance).

The second coating layer 130 may have a second thickness t2 on the second surface 110b of the base layer 110 (i.e., on a region overlapping the second surface 110b of the base layer 110 in the thickness direction), and may have a third thickness t3 on the first portion 110c1 of the third surface 110c1 and 110d1 of the base layer 110. Each of the second thickness t2 and the third thickness t3 may have a thickness of about 10 μm to 30 μm.

When each of the second thickness t2 and third thickness t3 of the second coating layer 130 is about 10 μm or more, the second coating layer 130 may facilitate the protection role (i.e., scratch resistance) of the cover window 100 against external impacts, for example, scratches. When each of the second thickness t2 and third thickness t3 of the second coating layer 130 is about 30 μm or less, the occurrence of yellowing of the cover window 100 may be prevented in advance.

According to an embodiment, since the maximum value of the third thickness t3 is a thickness of a portion of the second coating layer 130 covering the other part of the exposed first portion 110c1 of the base layer 110, the maximum value of the third thickness t3 may be greater than the maximum value of the second thickness t2 which is a thickness of a portion covering the upper surface of the first coating layer 120. However, the present invention is not limited thereto. The second coating layer 130 may not be disposed on the second portion 110d1 of the third surface 110c of the base layer 110. In some embodiments, the second coating layer 130 may be partially disposed on a part of the second portion 110d1.

The second coating layer 130 may be formed through slit coating. In some embodiments, the second coating layer 130 may be formed using bar coating, spin coating, spray coating, or the like.

The second coating layer 130 may additionally cover the other part of the third surface 110c of the base layer 110 exposed by the first coating layer 120, thereby preventing the cover window 100 from being exposed to external environment and damaged or preventing the occurrence of yellowing in advance.

As described above, since the first thickness t1 of the first coating layer 120 has a deviation of 10% or less on the second surface 110b, the first coating layer 120 may have a small hardness variation for each region on the second surface 110b.

Like the first coating layer 120, the second coating layer 130 may reinforce the strength of the cover window 100 (i.e., improving impact resistance).

In addition, the second coating layer 130 may serve to prevent peeling of the first coating layer 120 from the base layer 110 by covering the first coating layer 120.

The second coating layer 130 may protect the cover window 100 from an external impact, for example, a scratch (i.e., scratch resistance).

Moreover, the second coating layer 130 may further cover the other part of the third surface 110c1 of the base layer 110 exposed by the first coating layer 120, thereby preventing the cover window 100 from being exposed to external environment and damaged or preventing the occurrence of yellowing in advance.

Hereinafter, a method of manufacturing the above-described cover window 100 will be described. In the following embodiments, the same components as those of the previously described embodiments are referred to by the same reference numerals, and descriptions thereof will be omitted or simplified.

Figure 5:
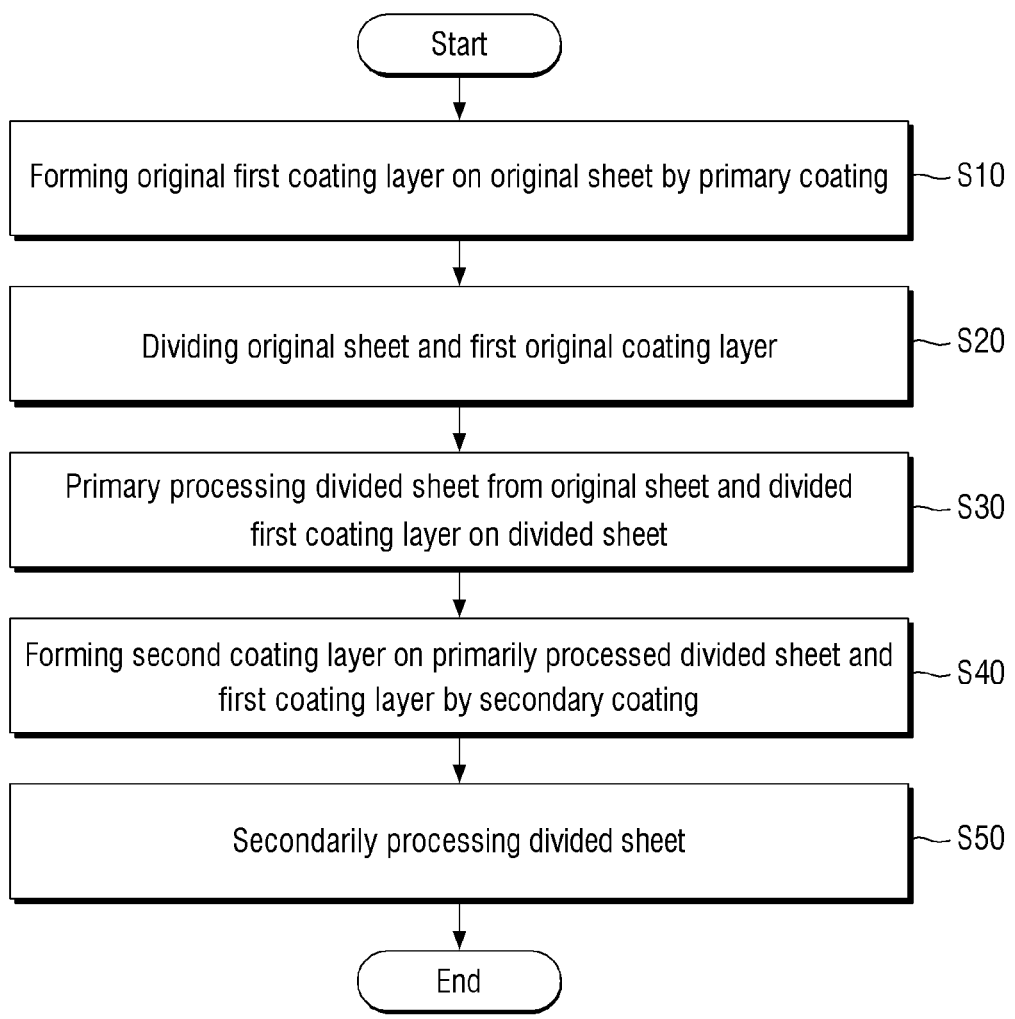
FIG. 5 is a flowchart illustrating a method of manufacturing a cover window according to an embodiment.
Figure 6:
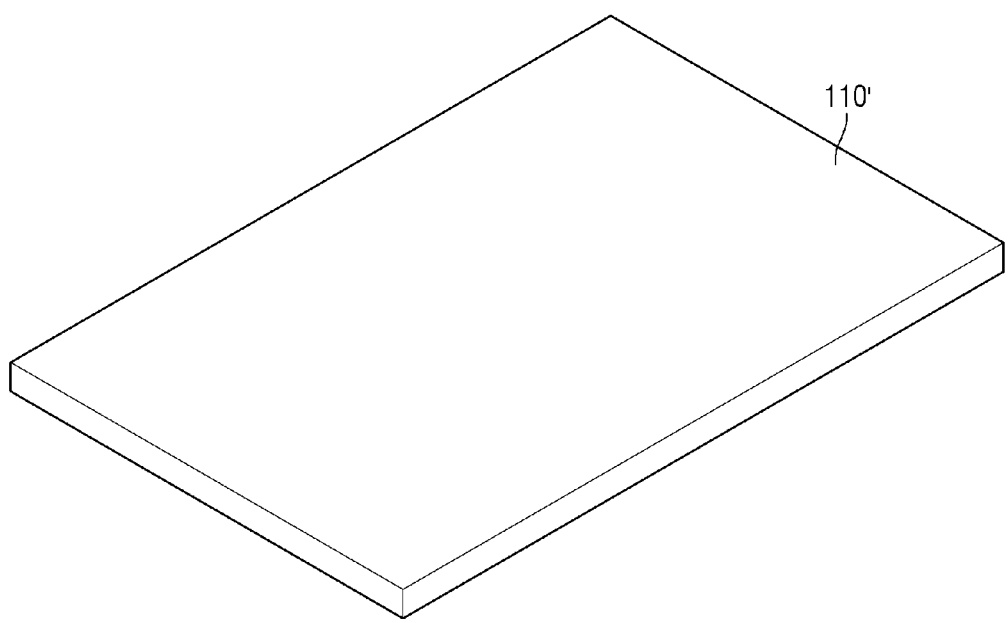
FIGS. 6 to 8 are perspective views of process steps of a method of manufacturing a cover window according to an embodiment.
Figure 6:
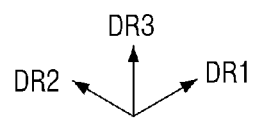
Figure 7:
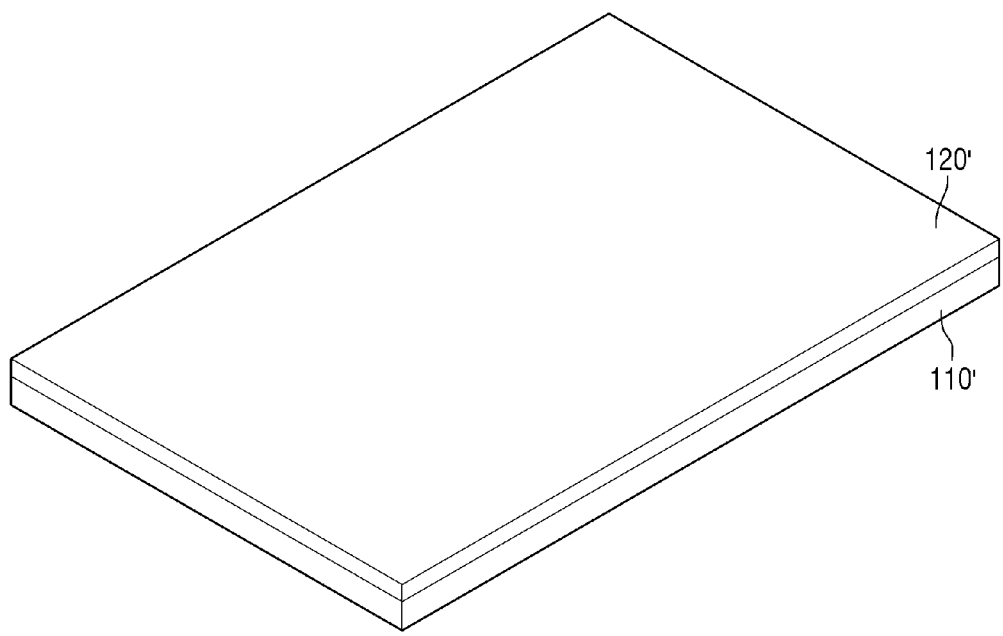
Figure 7:
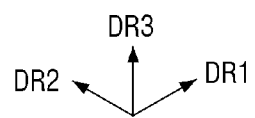
Figure 8:
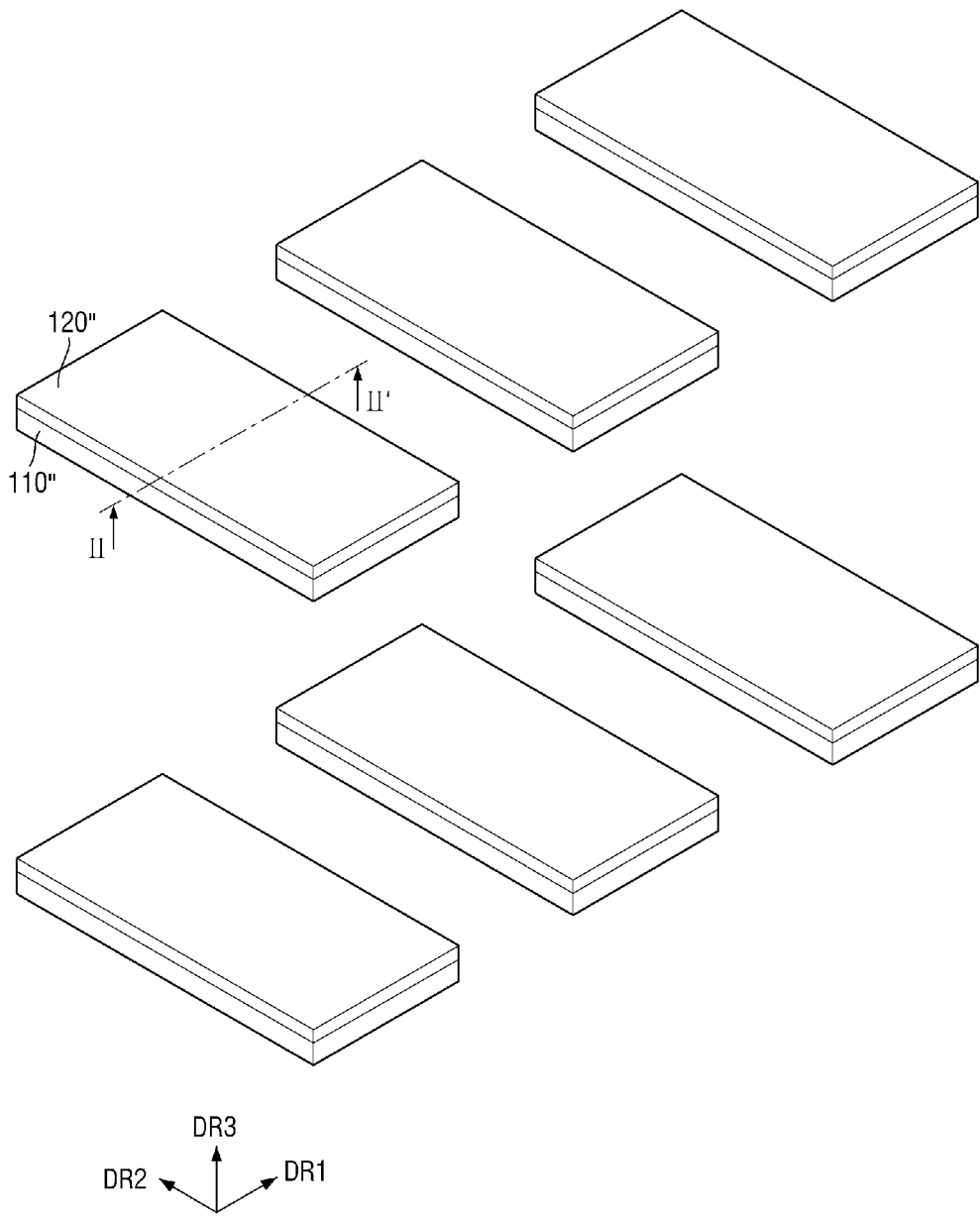
Figure 9:
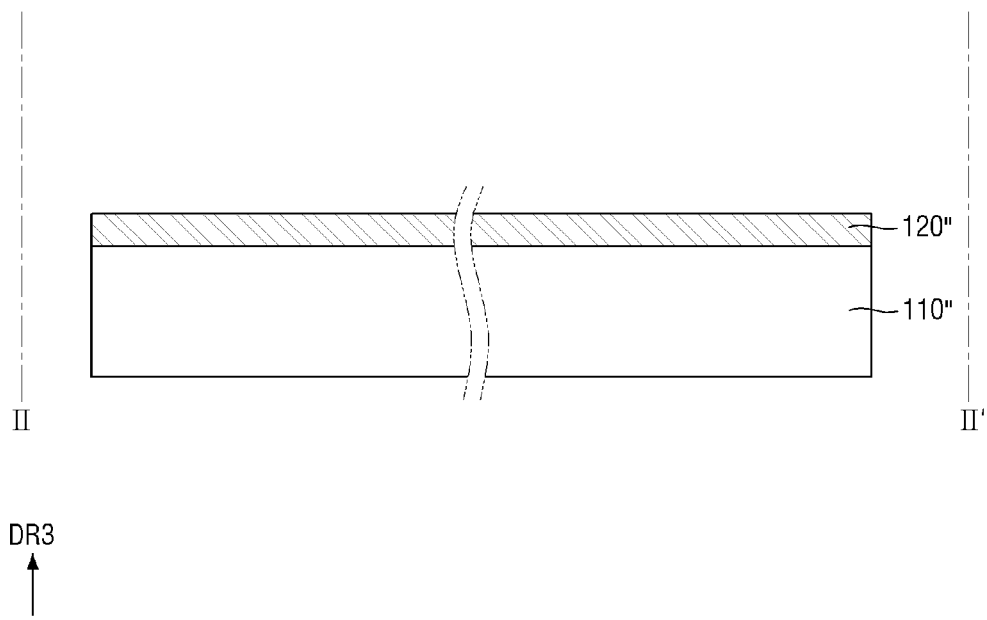
FIG. 9 is a cross-sectional view taken along the line II-IP of FIG. 8.
Figure 10:
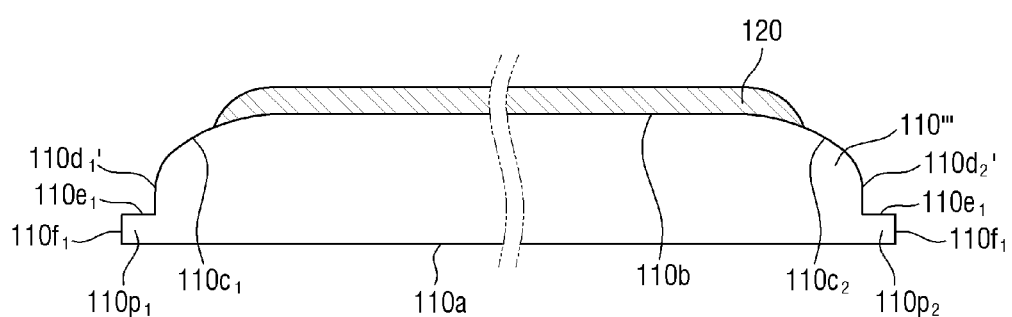
FIGS. 10 to 12 are perspective views of process steps of a method of manufacturing a cover window according to an embodiment.
Figure 10:
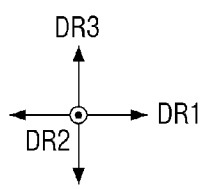
Figure 11:
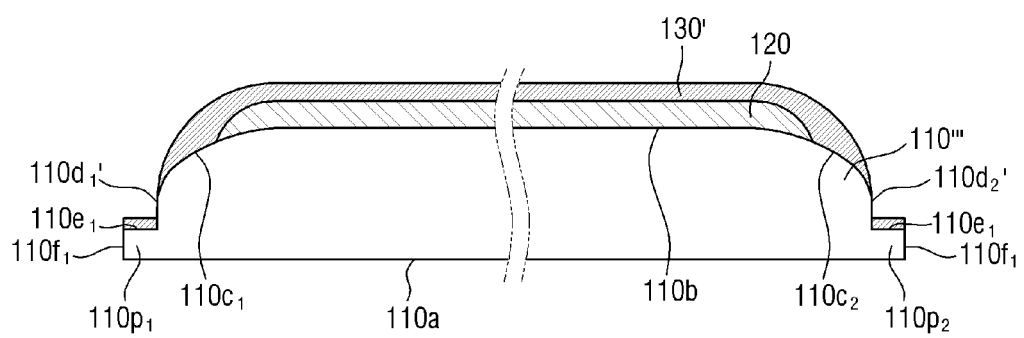
Figure 12:
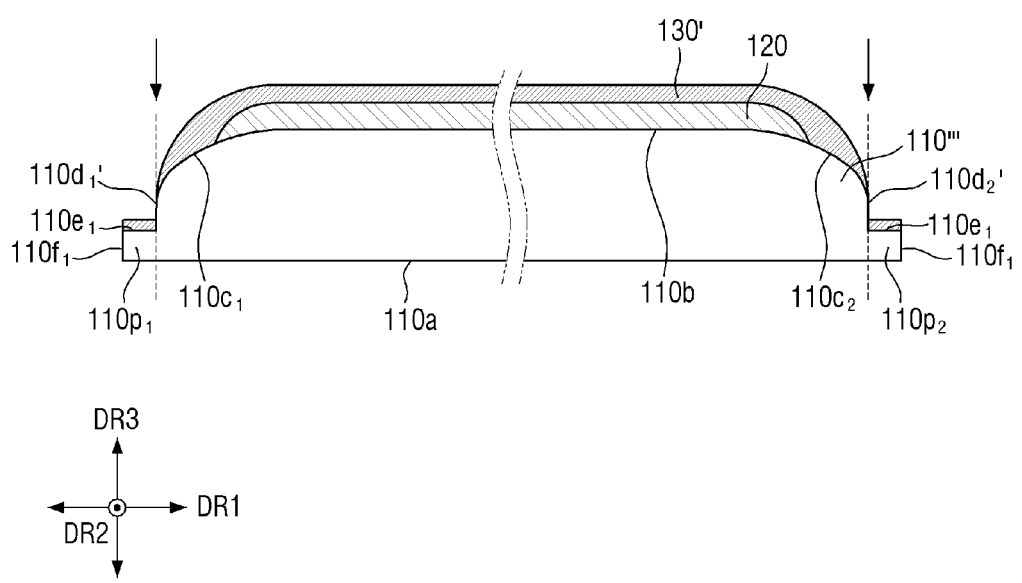

FIG. 5 is a flowchart illustrating a method of manufacturing a cover window according to an embodiment. FIGS. 6 to 8 are perspective views of process steps of a method of manufacturing a cover window according to an embodiment. FIG. 9 is a cross-sectional view taken along the line II-IP of FIG. 8. FIGS. 10 to 12 are perspective views of process steps of a method of manufacturing a cover window according to an embodiment.

Referring to FIGS. 5 and 6, an original sheet 110' is prepared.

The original sheet 110' may become the base layer 110 of the cover window 100 described above in FIGS. 3 and 4 after divided.

The original sheet 110' may include the same material as the above-described base layer 110.

In an embodiment, for example, the original sheet 110' may include a flexible material.

The original sheet 110' may have a rectangular shape, as shown in FIG. 6. For example, the original sheet 110' may include long sides (i.e., longitudinal sides) extending along the first direction DR1 and short sides (i.e., latitudinal sides) extending along the second direction DR2. The original sheet 110' may have a large area size. For example, the length of the long side of the original sheet 110' may be about 1700 millimeters (mm), and the length of the short side thereof may be about 1270 mm, but the present invention is not limited thereto.

Subsequently, referring to FIGS. 6 and 7, an original first coating layer 120' is formed on the original sheet 110' by primary coating (S10).

Specifically, the original first coating layer 120' may include the same material as the first coating layer 120 described above in FIG. 4. For example, the original first coating layer 120' may include an organic material such as an ultraviolet-curable acrylate resin or an ultraviolet-curable epoxy resin.

In an embodiment, the original first coating layer 120' may further include an inorganic material as well as the above-described organic material. An example of the inorganic material may include, but is not limited to, nano-silica sol.

In an embodiment, the original first coating layer 120' may be made of a mixed organic/inorganic material including the above-described organic material and the above-described inorganic material. The original first coating layer 120' may have a pencil hardness of HB or higher.

The original first coating layer 120' may be formed over the entire surface of the original sheet 110'.

The first coating of the original first coating layer 120' may be performed through slit coating. When the primary coating of the original first coating layer 120' proceeds through slit coating, it is performed on the original sheet 110' having a large area, so that the overall thickness deviation of the original first coating layer 120' may be reduced.

In an embodiment, for example, the thickness deviation of the original first coating layer 120' on the original sheet 110' may be about 10% or less. Thus, the original first coating layer 120' may have a small hardness variation for each region.

In some embodiments, the first coating layer 120 may be formed using bar coating, spin coating, spray coating, or the like.

Subsequently, referring to FIGS. 6, 8, and 9, both the original sheet 110' and the original first coating layer 120' are divided (S20).

The dividing of both the original sheet 110' and the original first coating layer 120' may be performed through a computer numerical control (CNC) device.

In some embodiments, the dividing of both the original sheet 110' and the original first coating layer 120' may be performed through a laser.

A divided sheet 110" and a divided first coating layer 120" may be formed through the dividing of the original sheet 110' and the first coating layer 120', respectively.

Although FIG. 8 illustrates six divided sheets 110" and six divided first coating layers 120", the present invention is not limited thereto, and the number of divided sheets 110" and the number of divided first coating layers 120' may be 2 to 5 or 7 or more, respectively, in another embodiment.

Side surfaces of the divided sheet 110" and side surfaces of the divided first coating layer 120" on the divided sheet 110" may be aligned with each other. The divided sheet 110" and the divided first coating layer 120" may have the same size as each other in a plan view.

Subsequently, referring to FIGS. 5, and 10, the divided sheet 110" and the divided first coating layer 120" on the divided sheet 110" are primarily processed to form a divided sheet 110''' and a first coating layer 120 (S30).

Specifically, the cross-sectional shape of the divided sheet 110''' and the first coating layer 120 formed by the primary processing of the divided sheet 110" and the divided first coating layer 120" on the divided sheet 110" may be substantially the same as the cross-sectional shape of the base layer 110 and the first coating layer 120 described above in FIG. 4, except for the protrusion portions 110P1 and 110P2. The primary processing of the divided sheet 110" and the divided first coating layer 120" may be performed through a computer numerical control (CNC) device.

In some embodiments, the primary processing of the divided sheet 110" and the divided first coating layer 120" on the divided sheet 110" may be performed through a laser.

The divided sheet 110''' of FIG. 10 may include a first surface 110a and a second surface 110b facing the first surface 110a and contacting the first coating layer 120. The first surface 110a and the second surface 110b may extend along the first direction DR1. The first surface 110a and the second surface 110b may be parallel to each other, but the present invention is not limited thereto. The length of the first surface 110a in the first direction DR1 may be longer than the length of the second surface 110b in the first direction DR1.

The divided sheet 110''' may further include a third surface between the first surface 110a and the second surface 110b. The third surface may physically connect the first surface 110a and the second surface 110b. The third surface may include one-side sub-surfaces 110c1, 110d1', 110e1, and 110f1 located at one side (i.e., left side) in the first direction DR1, and the other-side sub-surfaces 110c2, 110d2', 110e1, and 110f1 located at the other side (or right side) in the first direction DR1. The one-side sub-surfaces 110c1, 110d1', 110e1, and 110f1 and the other-side sub-surfaces 110c2, 110d2', 110e1, and 110f1 may divide the divided sheet 110''' into equal segments in the first direction DR1, and may be symmetrical to each other with respect to an equal segment line extending in the third direction DR3 and crossing a center of the base layer 110. Hereinafter, when there is no need to distinguish the one-side sub-surfaces 110c1, 110d1', 110e1, and 110f1 from the other-side sub-surfaces 110c2, 110d2', 110e1, and 110f1 while explaining the one-side sub-surfaces 110c1, 110d1', 110e1, and 110f1, the one-side sub-surfaces 110c1, 110d1', 110e1, and 110f1 are referred to as the third surface. Moreover, the divided sheet 110''' further includes protrusion portions 110p1 and 110p2 defined by the third portion 110e1, the fourth portion 110f1, and a part of the first surface 110a (to be described later). Even in the case of the protrusion portions 110p1 and 110p2, particularly, when there is no need to distinguish the protrusion portions 110p1 and 110p2 from each other, a description will be made based on the protrusion portion 110p1.

The cross-sectional shape of the third surface 110c1, 110d1', 110e1, and 110f1 may not have linear shape. For example, the cross-sectional shapes of the third surface 110c1, 110d1', 110e1, and 110f1 may include a linear shape and a curved shape.

The third surface 110c1, 110d1', 110e1, and 110f1 may include a first portion 110c1 disposed between the second surface 110b and the first surface 110a and connected to the second surface 110b, a second portion 110d1' disposed between the first portion 110c1 and the first surface 110a and connected to the first portion 110c1, a third portion 110e1 disposed between the second portion 110d1' and the first surface 110a and connected to the second portion 110d1', and a fourth portion 110f1 disposed between the third portion 110e1 and the first surface 110a and connected to the third portion 110e1 and the first surface 110a. The first portion 110c1 may have a curved shape, the second portion 110d1 may have a linear shape extending from the end of the first portion 110c1 in the third direction DR3, the third portion 110e1 may include a linear shape extending from the end of the second portion 110d1 to one side (i.e., left side) of the first direction DR1, and the fourth portion 110f1 may have a linear shape extending from the end of the third portion 110e1 in the third direction DR3.

The protrusion portion 110p1 may protrude toward one side of the first direction DR1 based on an extension line of the second portion 110d1 of the divided sheet 110' in the third direction DR3, shown in FIG. 10. The protrusion portion 110p1 may be composed of a third portion 110e1, a fourth portion 110f1, and a part of the first surface 110a. The protrusion portion 110p1 may be removed after forming the second coating layer.

The first coating layer 120 may be disposed on the second surface 110b of the divided sheet 110''' and a part of the first portion 110c1. The first coating layer 120 may be directly disposed on (be in direct contact with) the second surface 110b of the divided sheet 110''' and a part of the first portion 110c1. The first coating layer 120 may expose other portions of the third surface of the divided sheet 110''' except for a portion of the first portion 110c1.

According to the method of manufacturing the cover window according to an embodiment, since the primary processing is performed after primarily coating the original sheet 110' and dividing the original sheet 110', the deviation in thickness of the first coating layer may be greatly reduced, compared to when primary processing is first performed and then primary coating is performed.

Subsequently, referring to FIGS. 5 and 11, a second coating layer 130' is formed on the primarily processed divided sheet 110''' and the first coating layer 120 by secondary coating (S40).

The second coating layer 130' may be formed on the divided sheet 110''' and the first coating layer 120. The second coating layer 130' may be formed on the upper and side surfaces of the first coating layer 120, the other part of the first portion 110c1, and the third portion 110e1. The second coating layer 130' may not be formed on the second portion 110d1' or the fourth portion 110f1 extending along the third direction DR3, but the present invention is not limited thereto, and a part of the second coating layer 130' may be formed thereon.

The second coating layer 130' may be directly formed on the upper and side surfaces of the first coating layer 120, the other part of the first portion 110c1, and the third portion 110e1. For example, the second coating layer 130' may include an organic material such as an ultraviolet-curable acrylate resin or an ultraviolet-curable epoxy resin.

In an embodiment, the second coating layer 130' may further include an inorganic material as well as the above-described organic material. An example of the inorganic material may include, but is not limited to, nano-silica sol.

In an embodiment, the second coating layer 130' may be made of a mixed organic/inorganic material including the above-described organic material and the above-described inorganic material. The second coating layer 130' may have a pencil hardness of HB or higher.

The second coating layer 130' may be formed even on the protrusion portion 110p1. Thereafter, the second coating layer 130' formed on the protrusion 110p1 may be removed through secondary processing.

Next, referring to FIGS. 5 and 12, the divided sheet 110''' is secondarily processed (S50).

Specifically, the cover window 100 described above in FIG. 4 may be formed through the secondary processing (S50) of the divided sheet 110'''.

Through the secondary processing (S50) of the divided sheet 110', the protrusion portion 110p1 of the divided sheet 110' and the second coating layer 130' on the protrusion portion 110p1 may be removed.

The secondary processing (S50) of the divided sheet 110' may be performed through a computer numerical control (CNC) device.

In some embodiments, the secondary processing (S50) of the divided sheet 110' may be performed through a laser.

According to the cover window, the display device, and method of manufacturing the cover window of an embodiment, reliability of the cover window can be improved.

The effects of the present invention are not limited by the foregoing, and other various effects are anticipated herein.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A cover window, comprising:
a base layer;
a first coating layer on the base layer; and
a second coating layer on the first coating layer,
wherein, in a cross-sectional view, an entirety of the first coating layer is disposed between the base layer and the second coating layer,
the first coating layer directly contacts a first part of an upper surface of the base layer and exposes a second part of the upper surface of the base layer,
the upper surface of the base layer consists of the first part and the second part, and
the second coating layer directly contacts the second part of the upper surface of the base layer exposed by the first coating layer, and an upper surface of the first coating layer,
wherein the base layer includes:
a first surface;
a second surface facing the first surface; and
a third surface connected to the first surface and the second surface and including a surface inclined downward from the second surface toward the first surface,
wherein the upper surface of the base layer includes the second surface and a part of the third surface,
wherein the third surface includes a first portion connected to the second surface and a second portion between the first portion and the first surface, and
the first portion and the second portion have different shapes from each other,
wherein the first portion includes a curved surface, and the second portion includes a flat surface extending along a thickness direction of the base layer,
wherein the first coating layer directly contacts the second surface of the base layer and a first part of the first portion of the third surface, and does not directly contact a second part of the first portion of the third surface,
the first portion consists of the first and second parts thereof, and
the second coating layer directly contacts the second part of the first portion of the third surface.

2. The cover window of claim 1,
wherein the first coating layer has a first thickness in a thickness direction of the base layer, and
the first thickness has a deviation of 10 percentages (%) or less.

3. The cover window of claim 2,
wherein the first thickness of the first coating layer is in a range of about 20 micrometers (μm) to about 40 μm,
the second coating layer has a second thickness in the thickness direction, and
the second thickness is in a range of about 10 μm to about 30 μm.

4. The cover window of claim 2,
wherein the second coating layer has a second thickness on the second surface of the base layer and has a third thickness on the third surface in the thickness direction, and
the third thickness is greater than the second thickness.

5. The cover window of claim 1,
wherein each of the first coating layer and the second coating layer includes an organic-inorganic composite material.

6. The cover window of claim 5,
wherein the base layer includes plastic.

7. A display device, comprising:
a display panel; and
a cover window on the display panel,
wherein the cover window includes:
a base layer disposed on the display panel;
a first coating layer on the base layer; and
a second coating layer on the first coating layer,
wherein, in a cross-sectional view, an entirety of the first coating layer is disposed between the base layer and the second coating layer,
the first coating layer directly contacts a first part of the base layer and exposes a second part of the base layer,
an upper surface of the base layer consists of the first part and the second part, and
the second coating layer directly contacts the second part of the base layer exposed by the first coating layer, and the first coating layer,
wherein the base layer includes:
a first surface;
a second surface facing the first surface; and
a third surface connected to the second surface and including a surface inclined downward from the second surface toward the first surface,
wherein the third surface includes a first portion connected to the second surface and a second portion between the first portion and the first surface, the first portion and the second portion have different shapes from each other, the first portion includes a curved surface, and the second portion includes a flat surface extending along a thickness direction of the base layer, wherein the first coating layer directly contacts the second surface of the base layer and a first part of the first portion of the third surface, and does not directly contact a second part of the first portion of the third surface, the first portion consists of the first and second parts thereof, and the second coating layer contacts the second portion of the third surface of the base layer.

8. The display device of claim 7, wherein the cover window further extends to an outside of the display panel.

9. The display device of claim 7, wherein the first coating layer has a first thickness in a thickness direction of the base layer, and the first thickness has a deviation of 10% or less.

10. The display device of claim 7, wherein each of the first coating layer and the second coating layer includes an organic-inorganic composite material, and the base layer includes plastic.

* * * * *